(12) United States Patent
Pedersen et al.

(10) Patent No.: US 10,767,786 B2
(45) Date of Patent: Sep. 8, 2020

(54) VALVE WITH A PILOT VALVE SEAT ARRANGED IN A DIAPHRAGM

(71) Applicant: Danfoss A/S, Nordborg (DK)

(72) Inventors: Anders Pedersen, Middelfart (DK); Leo Finn Jensen, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/747,231

(22) PCT Filed: Jul. 25, 2016

(86) PCT No.: PCT/EP2016/067641
§ 371 (c)(1),
(2) Date: Jan. 24, 2018

(87) PCT Pub. No.: WO2017/029073
PCT Pub. Date: Feb. 23, 2017

(65) Prior Publication Data
US 2018/0216749 A1    Aug. 2, 2018

(30) Foreign Application Priority Data
Aug. 18, 2015    (EP) .................................... 15181333

(51) Int. Cl.
*F16K 31/40*    (2006.01)
(52) U.S. Cl.
CPC ................... *F16K 31/404* (2013.01)
(58) Field of Classification Search
USPC ............................. 251/30.01, 30.03, 30.04
See application file for complete search history.

(56) References Cited

U.S. PATENT DOCUMENTS

| 2,186,833 | A | * | 1/1940 | Iler ...................... F16K 7/126 |
| | | | | 251/268 |
| 3,946,983 | A | | 3/1976 | Engberg |
| | | | | (Continued) |

FOREIGN PATENT DOCUMENTS

| CN | 1231735 A | 10/1999 |
| CN | 1289016 A | 3/2001 |
| | (Continued) | |

OTHER PUBLICATIONS

International Search Report for Application No. PCT/EP2016/067641 dated Sep. 27, 2016.

*Primary Examiner* — Daphne M Barry
(74) *Attorney, Agent, or Firm* — McCormick, Paulding & Huber PLLC

(57) ABSTRACT

The invention relates to a valve (1) comprising a main valve (2), a pilot valve (3), a housing (4), an inlet (5) and an outlet (8). Opening and closing of the main valve (2) is controlled by the pilot valve (3). A pilot valve seat (10) is arranged in a diaphragm (6). A pilot chamber (11) is arranged in the housing (4) separated from the inlet (5) and the outlet (8) by the diaphragm (6). Task of the invention is to provide a valve with a lower cost. According to the invention a support member (17) supports the diaphragm (6), wherein the support member (17) is guided in the housing, and wherein a radial gap (26) is arranged between the radially outer end of the diaphragm (6) and the housing (4) in a radial direction perpendicular to the opening direction of the pilot valve (3). Thereby, a cheaper, less resistant material for the diaphragm can be used.

14 Claims, 3 Drawing Sheets

(56) References Cited

U.S. PATENT DOCUMENTS

| | | | |
|---|---|---|---|
| 5,449,142 A | 9/1995 | Banick | |
| 6,354,562 B1 | 3/2002 | Fukano et al. | |
| 6,508,266 B2 * | 1/2003 | Iritani | F16K 7/126 |
| | | | 137/15.11 |
| 8,464,998 B2 * | 6/2013 | Maercovich | E03C 1/057 |
| | | | 251/30.04 |
| 9,328,829 B2 * | 5/2016 | Fukano | F16K 7/12 |
| 2009/0194727 A1 * | 8/2009 | Platz | F16K 31/404 |
| | | | 251/335.3 |
| 2019/0040976 A1 * | 2/2019 | Hansen | F16K 31/404 |

FOREIGN PATENT DOCUMENTS

| | | |
|---|---|---|
| DE | 1167611 B | 4/1964 |
| EP | 0 047 790 A1 | 3/1982 |
| EP | 2 818 779 A1 | 12/2014 |
| WO | 2010/045946 A1 | 4/2010 |
| WO | 2010045946 A1 | 4/2010 |
| WO | 2014/207683 A1 | 12/2014 |

* cited by examiner

VALVE WITH A PILOT VALVE SEAT ARRANGED IN A DIAPHRAGM

CROSS-REFERENCE TO RELATED APPLICATION

This application is a National Stage application of International Patent Application No. PCT/EP2016/067641, filed on Jul. 25, 2016, which claims priority to European Patent Application No. 15181333.4, filed on Aug. 18, 2015, each of which is hereby incorporated by reference in its entirety.

TECHNICAL FIELD

The invention relates to a valve comprising a main valve, a pilot valve, a housing, an inlet and an outlet, wherein opening and closing of the main valve is controlled by the pilot valve, and wherein a pilot valve seat is arranged in a diaphragm, and wherein a pilot chamber is arranged in the housing separated from the inlet and the outlet by the diaphragm.

BACKGROUND ART

Piloted valves are often used to control the flow of fluids, in particular under increased fluid pressure. The pilot valve is a directly controlled valve, e.g. a solenoid valve or the like. By operating the pilot valve the pressure differences between the pilot chamber and the inlet/outlet can be changed to indirectly open the main valve. Under high fluid pressures this solution is more reliable and energy saving then having to overcome the pressure forces with a directly operated valve.

A valve of the above mentioned kind is for example known from WO 2014/207683 A1. Therein the diaphragm is supported by a washer ring and two ring disk-shaped support members. The center of the diaphragm is sandwiched between the two ring disk-shaped support members. A radially outer end of the diaphragm is fixed to the housing by the washer ring. The pilot valve orifice is arranged in the center of both ring disk-shaped support members.

This solution works well to keep the diaphragm in place and the priority valve seat centered if the diaphragm is sufficiently rigid and does not expand or contract too much due to thermal influences or due to absorption of a refrigerant or other fluids. Consequently, the choice of materials for the diaphragm is rather limited. At the same time, the limited choice of materials also result in a limitation of the applications of the valve since the possible materials for the diaphragm are in some cases incompatible to certain fluids and/or pressure or temperature conditions.

SUMMARY

The task according to the invention is therefore to provide a valve of the above mentioned kind, that allows to use a wider range of materials for the diaphragm.

According to the invention the above task is solved in a valve of the initially mentioned kind in that a support member supports the diaphragm, wherein the support member is guided in the housing, and wherein a radial gap is arranged between the radially outer end of the diaphragm and the housing in a radial direction perpendicular to the opening direction of the pilot valve.

This solution ensures that the diaphragm will stay centered even if the diaphragm should thermally expand or shrink. The support member will ensure that the diaphragm and any embedded parts, e.g. a pilot valve seat, will not tilt or move uncontrolled during operation of the valve.

Furthermore, if a radial gap is arranged between the radially outer end of the diaphragm and the housing in a radial direction perpendicular to the opening direction of the pilot valve. This allows the diaphragm to expand in the radial direction, for example, due to an increase in temperature or an absorption of a refrigerant. This is in particular advantageous if the diaphragm is made from a material with a relatively large coefficient of thermal expansion.

The support member can for example slide along an inner surface of the housing when the main valve opens or closes. This solution allows for a more controlled movement of the diaphragm during opening or closing of the main valve, and therefore the requirements on the rigidness and thermal expansion coefficient of the diaphragm can be lowered significantly. Therefore it is possible to choose the diaphragm from a wider range of materials, while maintaining full functionality. At the same time the range of applications for the valve is increased.

In a preferred embodiment the support member is guided in a cylindrical bore of the housing. In this case the support member can also be substantially rotationally symmetric. The support member can, for example, be substantially pan-shaped with a central opening.

In a further preferred embodiment the support member is guided in the bore by fitting into the bore at a circumferential, radially outer end of the support member. With this solution a stable movement of the support member as well as the diaphragm and the pilot valve seat can be ensured during opening or closing of the main valve.

It is furthermore preferred if the diaphragm has a larger diameter than the bore. It is not necessary to completely cover the side of the diaphragm facing the pilot chamber with the support member, but one mostly needs to ensure that the pilot valve seat arranged near the center of the diaphragm is kept centered.

In a further preferred embodiment the support member comprises a radially extending bottom plate and a circumferential wall substantially extending in an axial direction parallel to the opening direction of the pilot valve. The support member can thus be pan-shaped with a flat bottom and a wall extending in an axial direction away from the bottom plate at the radially outer end of the support member.

It is preferred if the circumferential wall has an S-shaped cross section. This embodiment allows for a simple production of the support member for example by a deep drawing process from a metal disk. The radially outer end of the support member (i.e. one end of the "S") can lie flat against the bore. This ensures a stable guidance of the diaphragm in the housing. Other shapes of the circumferential wall are also possible, for example a step-shape or L-shape.

It is preferred, if the support member supports the diaphragm on the side of the diaphragm facing the pilot chamber. In this case, the support member can be guided in a cylindrical bore of the housing, wherein the bore is arranged in the pilot chamber. Alternatively, the support member can also be arranged on the side of the diaphragm facing the inlet and/or the outlet.

It is furthermore preferred if an axial gap is arranged between the radially outer end of the diaphragm and the housing in an axial direction parallel to the opening direction of the pilot valve. The diaphragm will thus not be fixed to the housing in an axial direction at the radially outer end of the diaphragm. In particular, if the diaphragm has a higher coefficient of thermal expansion it is advantageous if such an axial gap is arranged between the diaphragm and the housing to allow the diaphragm to thermally expand. In the axial direction the size of the gap is preferably smaller than the thickness of the diaphragm in the axial direction. This ensures that the radially outer end of the diaphragm cannot flip over and thus open a direct fluid connection from the inlet to the pressure chamber, whereby the valve would be rendered unresponsive.

In a preferred embodiment the diaphragm is also supported by an outlet support member on the side of the diaphragm facing the outlet. In this embodiment the diaphragm is thus at least partially sandwiched between the support member and the outlet support member, for example, in a central section of the diaphragm. Furthermore, an orifice member in which the pilot valve orifice and the pilot valve seat are arranged can be fixed to the diaphragm this way.

It is preferred if the diaphragm comprises at least one bleedhole connecting the inlet and the pilot chamber. This solution ensures that the pressure difference between the pressure chamber and the inlet does not become too large which may otherwise prevent the main valve from closing.

Furthermore, it is preferred if the support member comprises at least one bleed aperture connecting the inlet and the pilot chamber.

Preferably, the bleed holes and the bleed apertures are aligned in an axial direction parallel to the opening direction of the pilot valve. In this embodiment it is ensured that the pressure difference between the pressure chamber and the inlet can be controlled in such a way that the diaphragm will not be damaged even if the pressure difference between inlet and outlet becomes large. Furthermore, by choosing appropriate sizes of the bleed holes in the diaphragm and the bleed apertures in the support member the pressure drop over the bleed holes and bleed apertures from the inlet to the pressure chamber may be controlled.

It is preferred if a washer is arranged on the side of the diaphragm facing the inlet, wherein the washer limits the movement of a radial outer end of the diaphragm in an axial direction parallel to the opening direction of the pilot valve. The washer preferably has the shape of a ring disk with openings to allow the fluid flow from the inlet to the diaphragm or, in case the main valve is open from the inlet through the main valve opening towards the outlet. The washer can furthermore ensure that the radially outer end of the diaphragm does not get displaced out of the space between the housing and the washer, while still allowing the thermal expansion or contraction of the diaphragm, for example, into an axial gap or a radial gap. The diaphragm is preferably neither fixed to the housing nor the washer.

Preferably, the diaphragm is a non-laminated diaphragm. With the use of a guided support member it is possible to use non-laminated diaphragms while maintaining full functionality of the valve. Possible materials for the diaphragm are a non-reinforced polymer or rubber.

BRIEF DESCRIPTION OF THE DRAWINGS

Preferred embodiments of the invention will now be described with reference to the figures, wherein.

DETAILED DESCRIPTION

Figure 1:
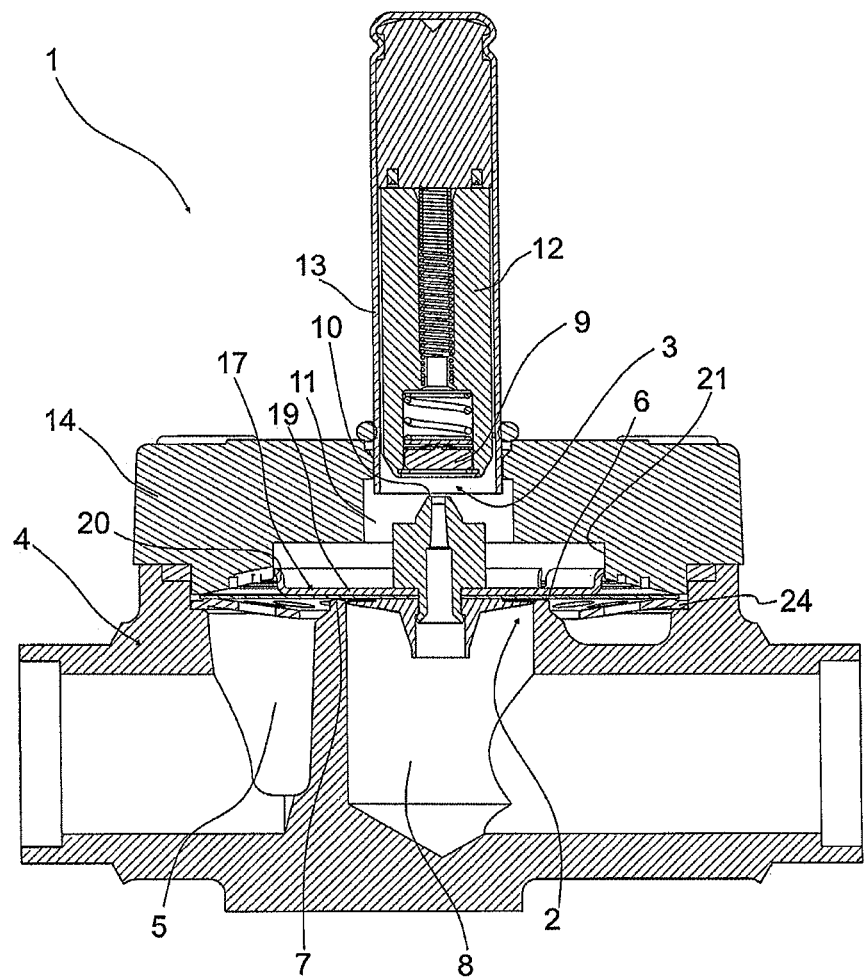
FIG. 1 shows a cross section of a valve according to the invention.
Figure 2:
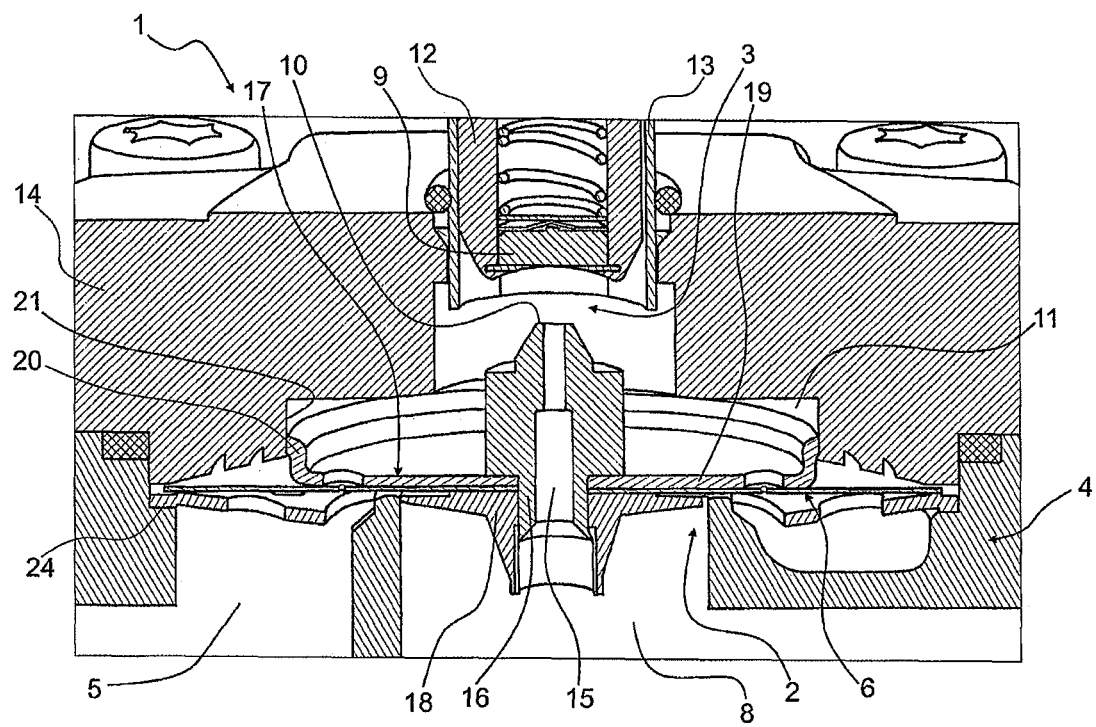
FIGS. 2 and 3 show an enlarged cross section of the valve according to FIG. 1 at two different inclination angles.
Figure 3:
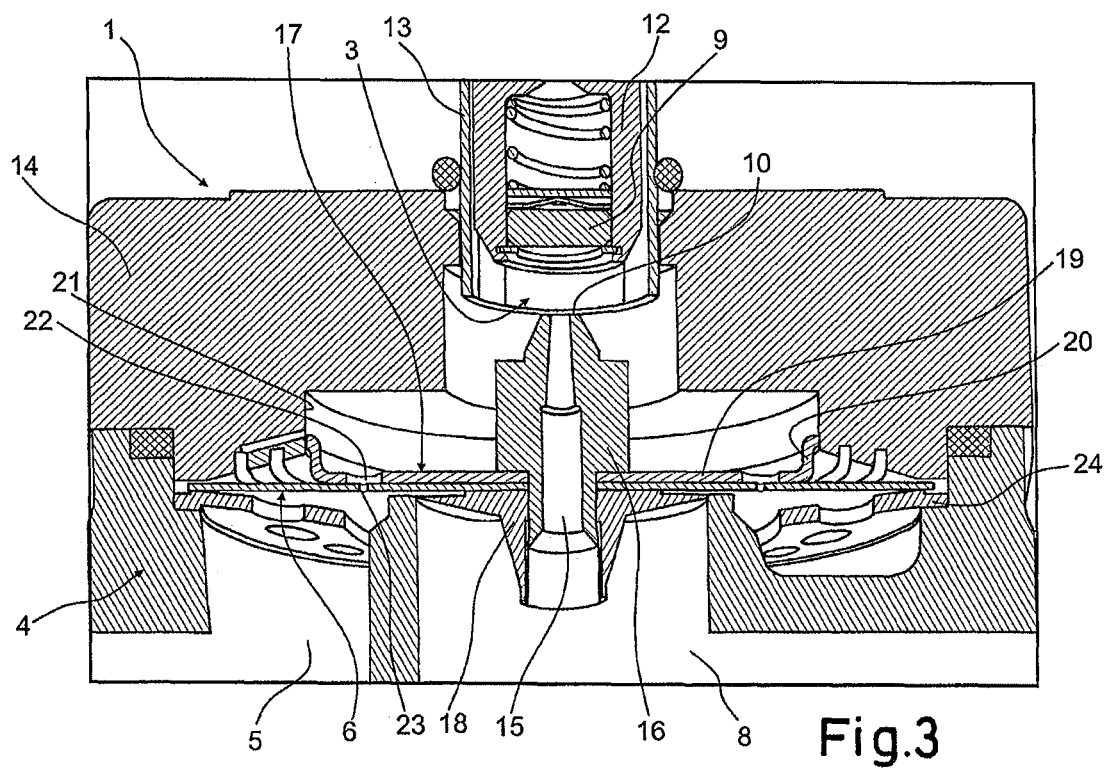

FIG. 1 to 5 show a valve 1 comprising a main valve 2 and a pilot valve 3. Both the main valve 2 and the pilot valve 3 are arranged in a common housing 4.

An inlet 5 leads to the main valve 2, which is in FIG. 1 to 5 closed by a diaphragm 6 engaging a main valve seat 7. In an open state of the main valve 2, the fluid can pass the main valve 2 towards an outlet 8.

The pilot valve 3 here is a solenoid valve, where the coil of the valve is not shown for simplicity. In FIG. 1 to 5 the pilot valve element 9 does not engage the pilot valve seat 10, and therefore the pilot valve 3 is open.

The diaphragm 6 separates the inlet 5 and the outlet 8 from a pilot chamber 11. The diaphragm 6 is preferably made from a non-reinforced polymer or rubber material.

The pilot valve 3 comprises a pilot valve member 12, in which the pilot valve element 9 is arranged.

The pilot valve member 12 is slidably arranged in an armature tube 13. The housing 4 comprises a cover 14 in which the pilot chamber 11 is arranged. The pilot chamber 11 comprises several concentrical, cylindrical bores. The armature tube 13 enters into the smallest of the bores and is sealed to the cover 14.

The pilot valve orifice 15 is arranged in an orifice member 16. The orifice member 16 is centered in the diaphragm 6. On the side of the diaphragm 6 facing the pilot chamber 11 a support member 17 is arranged. The support member 17 covers a central part of the diaphragm 6 from one side. On the side of the diaphragm 6 opposite to the support member 17 an outlet support member 18 is arranged. The diaphragm 6 is therefore partially sandwiched between the support member 17 and the outlet support member 18.

The support member 17 comprises a radially extending bottom plate 19 and a circumferential wall 20. The circumferential wall 20 substantially extends in an axial direction parallel to the opening direction of the pilot valve 3. The circumferential wall 20 has an S-shaped cross section. One end of the circumferential wall 20 is connected to the bottom plate 19. The radially outer end of the support member 17 touches a bore 21 of the housing 4. The bore 21 here has a cylindrical cross section. The support member 17 is slidingly guided in the bore 21. Thereby, the support member 17 as well as the diaphragm 6 and the pilot valve seat 10 are centered and guided in the housing. To this end, the radially outer end of the support member 17 at the circumferential wall 20 has a flat circumferential surface that runs parallel to the opening direction of the pilot valve 3. Thereby, the support member 17 can slide up and down in the bore 21 when the main valve 2 opens or closes.

The support member 17 furthermore comprises at least one bleed aperture 22. In this embodiment the support member 17 comprises four bleed apertures 22 that are arranged symmetrically around the symmetry axis of the support member 17 and the diaphragm 6. The diaphragm 6 comprises at least one bleed hole 23. In this embodiment the diaphragm 6 comprises four bleed holes 23 that are arranged on a circle around the central symmetry axis of the diaphragm 6. In this embodiment each bleed hole 23 is aligned with a bleed aperture 22 in an axial direction parallel to the opening direction of the pilot valve 3. The bleed holes 23 and bleed apertures 22 allow for small amounts of fluid to flow in and out of the pilot chamber 11 from the inlet 5. Preferably the bleed aperture 22 has a larger cross section than the bleed hole 23. This way the pressure of the fluid flowing from the inlet 5 into the pressure chamber 11 is reduced whereby a pressure difference between the inlet 5 and the pressure chamber 11 is maintained. A washer 24 is arranged on an opposite side of the diaphragm 6 relative to the support member 17. The washer 24 ensures that the radial end 25 of the diaphragm 6 can be substantially kept in position even if the diaphragm 6 expands or contracts due to thermal influences.

Figure 4:
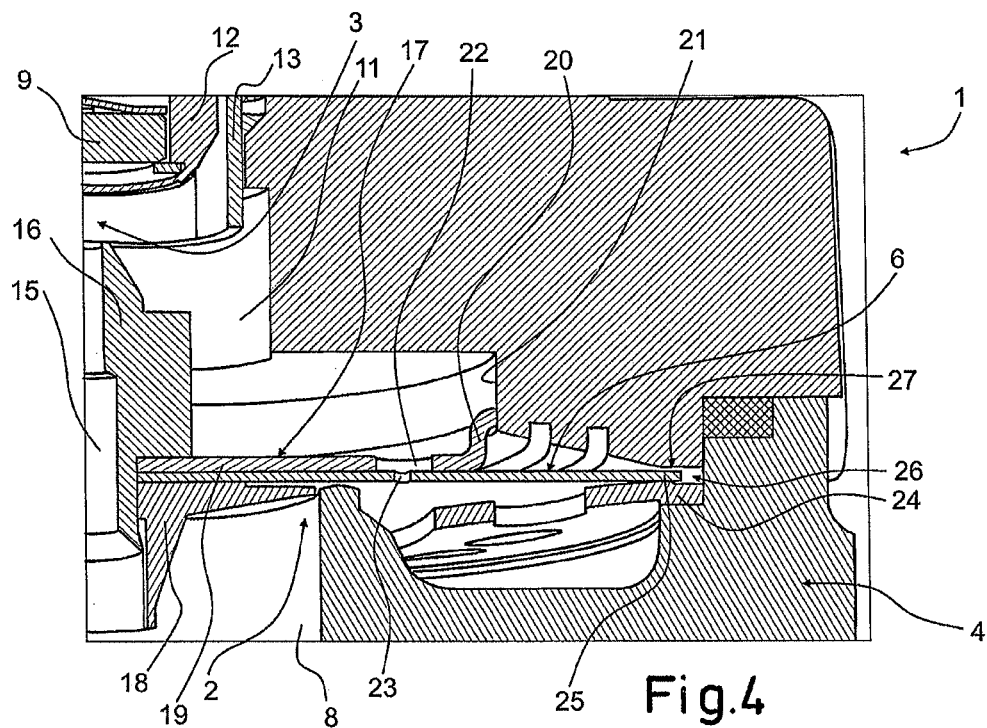
FIGS. 4 and 5 show a further enlarged cross section of the valve according to FIG. 1 to 3 and in particular the diaphragm as well as the support member at two different inclination angles.
Figure 5:
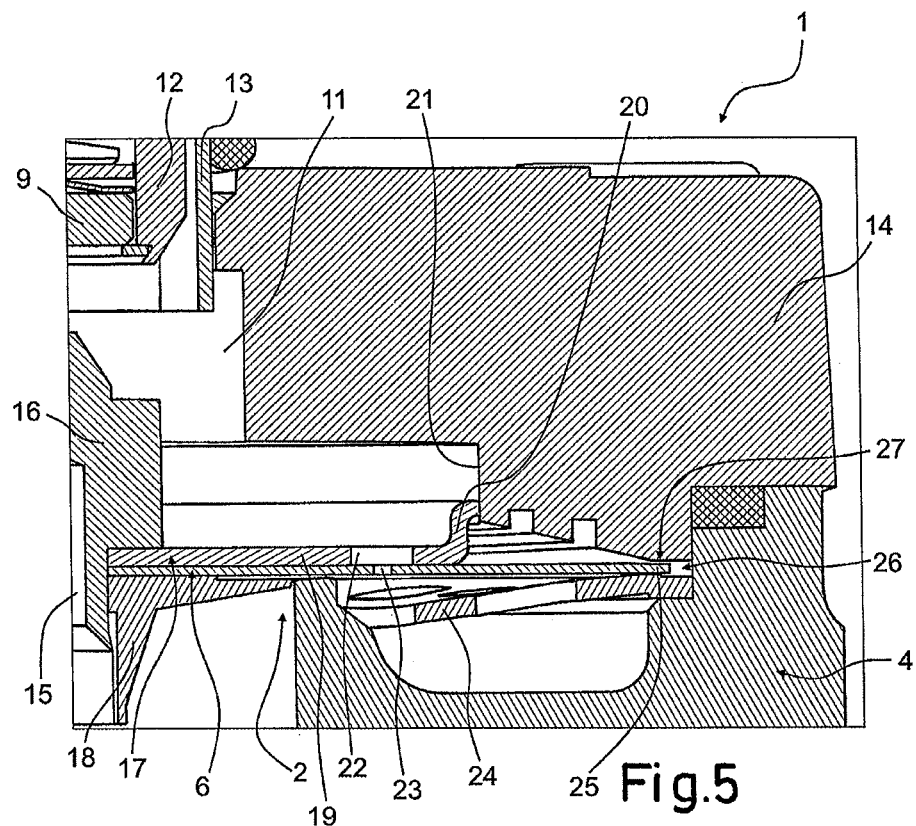

As one can see in FIGS. 4 and 5 a radial gap 26 is arranged between the radially outer end of the diaphragm 6 and the housing 4 in a radial direction perpendicular to the opening direction of the pilot valve 3.

Furthermore, an axial gap 27 is arranged between the radially outer end of the diaphragm 6 and the housing 4 in an axial direction parallel to the opening direction of the pilot valve 3. Preferably, the axial extension of the axial gap 27 is smaller than the axial extension of the diaphragm 6. This ensures that the radial end 25 of the diaphragm 6 will not completely move out of position when thermally expanding or contracting or if the main valve 2 opens or closes.

With the solution according to the invention a reliable centering of the diaphragm in the valve can be ensured, even if the diaphragm is not made from a particularly robust and expensive material like fiber reinforced modified Teflon. Instead, with the solution according to the invention a cheaper material for the diaphragm 6 may be used, whereby the costs of production of the valve can be lowered. At the same time the opening and closing behavior of the valve remains reliable.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A valve comprising a main valve, a pilot valve, a housing, an inlet and an outlet, wherein opening and closing of the main valve is controlled by the pilot valve, and wherein a pilot valve seat is arranged in a diaphragm, and wherein a pilot chamber is arranged in the housing separated from the inlet and the outlet by the diaphragm, wherein, a support member supports the diaphragm, and the support member is guided in the housing, and wherein a radial gap is arranged between the radially outer end of the diaphragm and the housing in a radial direction perpendicular to the opening of the pilot valve, wherein the support member is guided in a cylindrical bore of the housing by fitting into the cylindrical bore at a circumferential, radially outer end of the support member such that a surface at the radially outer end of the support member that runs in an axial direction parallel to the opening direction of the pilot valve is in contact with the cylindrical bore of the housing such that the support member is slidingly guided in the cylindrical bore, wherein the support member is a unitary support member.

2. The valve according to claim 1, wherein, the diaphragm has a larger diameter than the cylindrical bore.

3. The valve according to claim 2, wherein, the support member comprises a radially extending bottom plate and a circumferential wall extending in the axial direction parallel to the opening direction of the pilot valve.

4. The valve according to claim 1, wherein, the support member comprises a radially extending bottom plate and a circumferential wall extending in the axial direction parallel to the opening direction of the pilot valve.

5. The valve according to claim 4, wherein, the circumferential wall has an S-shaped cross section.

6. The valve according to claim 1, wherein, the support member supports the diaphragm on the side facing the pilot chamber.

7. The valve according to claim 1, wherein, an axial gap is arranged between the radially outer end of the diaphragm and the housing in the axial direction parallel to the opening direction of the pilot valve.

8. The valve according to claim 1, wherein, the diaphragm is also supported by an outlet support member on the side of the diaphragm facing the outlet.

9. The valve according to claim 1, wherein, the diaphragm comprises at least one bleed hole connecting the inlet and the pilot chamber.

10. The valve according to claim 1, wherein, the support member comprises at least one bleed aperture connecting the inlet and the pilot chamber.

11. The valve according to claim 1, wherein the diaphragm comprises at least one bleed hole connecting the inlet and the pilot chamber, wherein the support member comprises at least one bleed aperture connecting the inlet and the pilot chamber and wherein the at least one bleed hole and the at least one bleed aperture are aligned in the axial direction parallel to the opening direction of the pilot valve.

12. The valve according to claim 1, wherein, a washer is arranged on the side of the diaphragm facing the inlet, wherein the washer limits the movement of a radial outer end of the diaphragm in the axial direction parallel to the opening direction of the pilot valve.

13. The valve according to claim 1, wherein, the diaphragm is a non-laminated diaphragm.

14. The valve according to claim 1, wherein the support member is slidingly guided in the cylindrical bore such that the support member, the diaphragm and the pilot valve seat are centered and guided in the housing.

* * * * *